United States Patent
Schütt et al.

(10) Patent No.: US 10,399,527 B2
(45) Date of Patent: Sep. 3, 2019

(54) VEHICLE ROOF HAVING A ROOF OPENING

(71) Applicant: Webasto SE, Stockdorf (DE)

(72) Inventors: Thomas Schütt, Stockdorf (DE);
Jochen Haussmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/440,861

(22) Filed: Feb. 23, 2017

(65) Prior Publication Data
US 2017/0267199 A1    Sep. 21, 2017

(30) Foreign Application Priority Data

Mar. 15, 2016   (DE) .................. 10 2016 104 780

(51) Int. Cl.
| | |
|---|---|
| *B60R 21/213* | (2011.01) |
| *B60R 21/08* | (2006.01) |
| *B60R 21/13* | (2006.01) |
| *B60R 21/00* | (2006.01) |

(52) U.S. Cl.
CPC .............. *B60R 21/08* (2013.01); *B60R 21/13* (2013.01); *B60R 2021/0018* (2013.01)

(58) Field of Classification Search
CPC .. B60R 21/08; B60R 21/13; B60R 2021/0018
USPC ...... 280/730.1, 749, 751, 753; 296/212, 224
See application file for complete search history.

(56) References Cited

U.S. PATENT DOCUMENTS

| | | | | |
|---|---|---|---|---|
| 3,721,468 A | * | 3/1973 | Burgess | B60R 21/08 280/749 |
| 5,602,734 A | * | 2/1997 | Kithil | B60N 2/002 180/282 |
| 6,135,491 A | * | 10/2000 | Olson | B60R 13/0212 280/730.2 |
| 6,189,960 B1 | * | 2/2001 | Mumura | B60J 7/0015 160/7 |
| 9,610,915 B2 | * | 4/2017 | Specht | B60R 21/213 |
| 9,771,048 B2 | * | 9/2017 | Min | B60R 21/2338 |

(Continued)

FOREIGN PATENT DOCUMENTS

| | | |
|---|---|---|
| DE | 198 03164 A1 | 7/1999 |
| DE | 100 07 343 A1 | 8/2001 |

(Continued)

*Primary Examiner* — Toan C To
(74) *Attorney, Agent, or Firm* — Fitch, Even, Tabin & Flannery, LLP

(57) ABSTRACT

A vehicle roof having an opening, which can be closed or at least partially released by a roof element or which is closed by means of a glass hardtop element or a plastic hardtop element, as well as an emergency retaining device, which is deactivated during standard operation of the corresponding vehicle and which at least partially covers the roof opening during an accident, in particular when the vehicle is overturning, and which comprises at least one fabric, which can be folded and/or wound up, said fabric taking up a folded and/or wound-up storage position during standard operation of the vehicle and being pulled out by means of a driving device and being brought into a covering position during an accident so that the roof opening is at least partially covered by the fabric said driving device working independently of a signal from a sensor which detects the accident.

19 Claims, 8 Drawing Sheets

(56) References Cited

U.S. PATENT DOCUMENTS

| | | | | |
|---|---|---|---|---|
| 2002/0125690 A1* | 9/2002 | Boll | ................... | B60R 21/213 280/730.1 |
| 2003/0122354 A1* | 7/2003 | Spaulding | ............ | B60R 21/213 280/730.2 |
| 2005/0017546 A1* | 1/2005 | Steuer | ................ | B60R 13/0212 296/216.01 |
| 2006/0261508 A1* | 11/2006 | Lustiger | ............. | B29C 45/0005 264/140 |
| 2007/0052226 A1* | 3/2007 | Tobaru | ................... | B60R 21/13 280/756 |
| 2012/0313354 A1* | 12/2012 | Ochiai | ................ | B60R 21/213 280/728.2 |
| 2014/0217710 A1* | 8/2014 | Fukawatase | ......... | B60R 21/233 280/730.2 |

FOREIGN PATENT DOCUMENTS

| | | |
|---|---|---|
| DE | 100 39 803 A1 | 2/2002 |
| DE | 100 39 806 A1 | 5/2002 |

\* cited by examiner

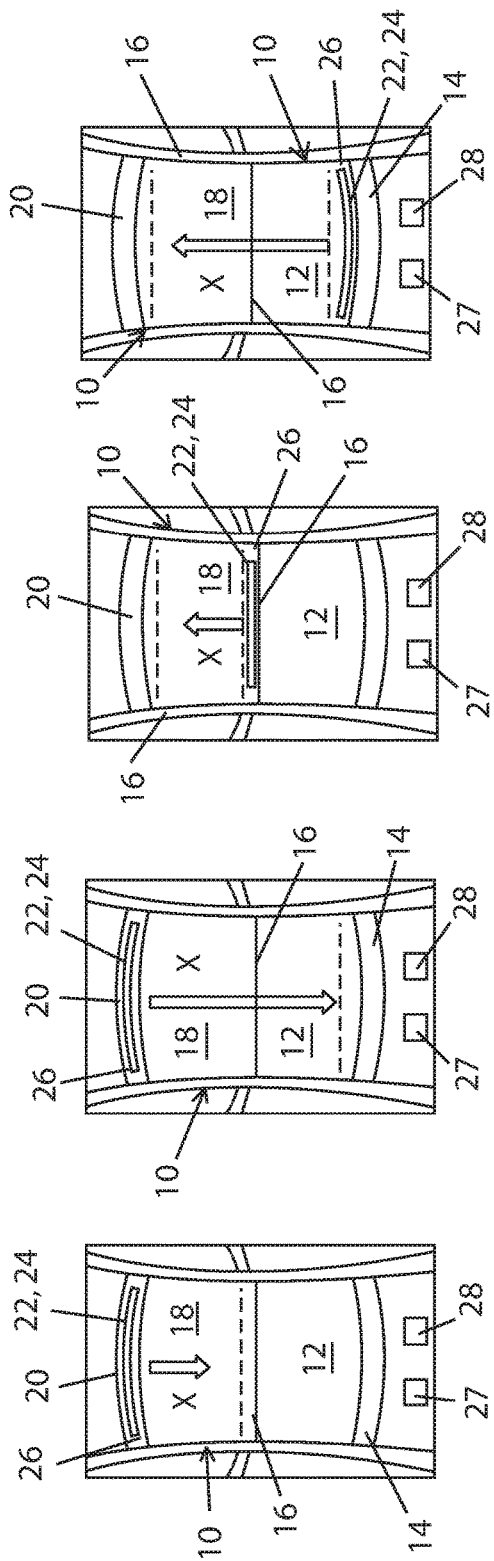

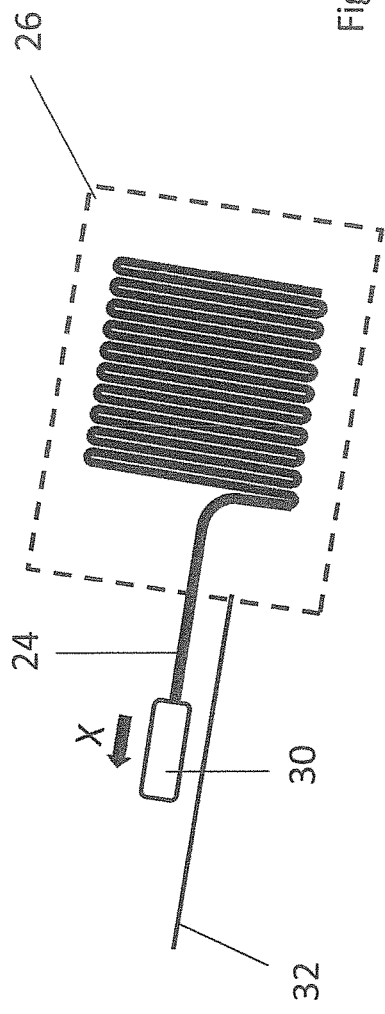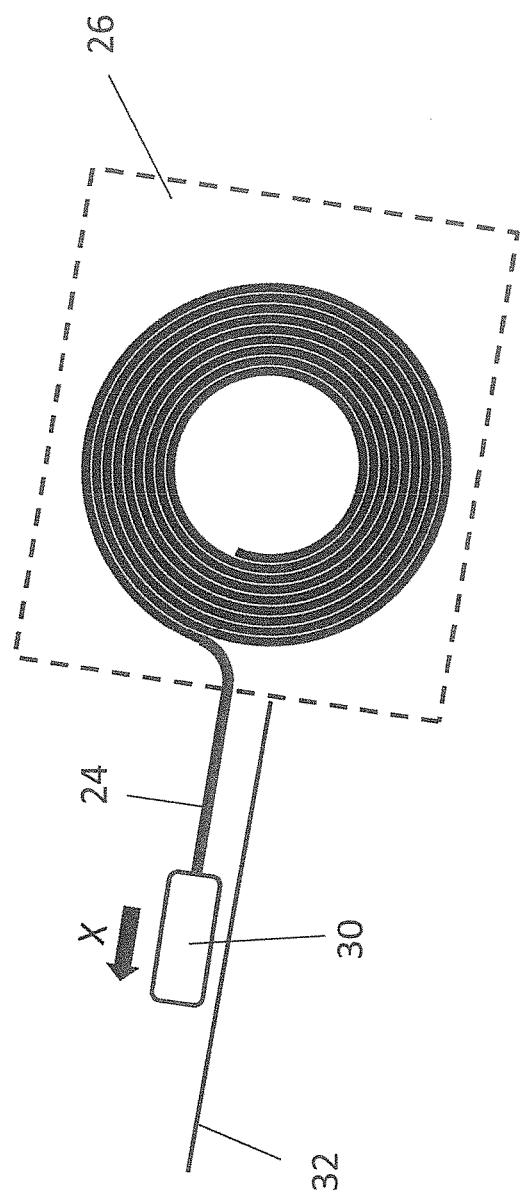

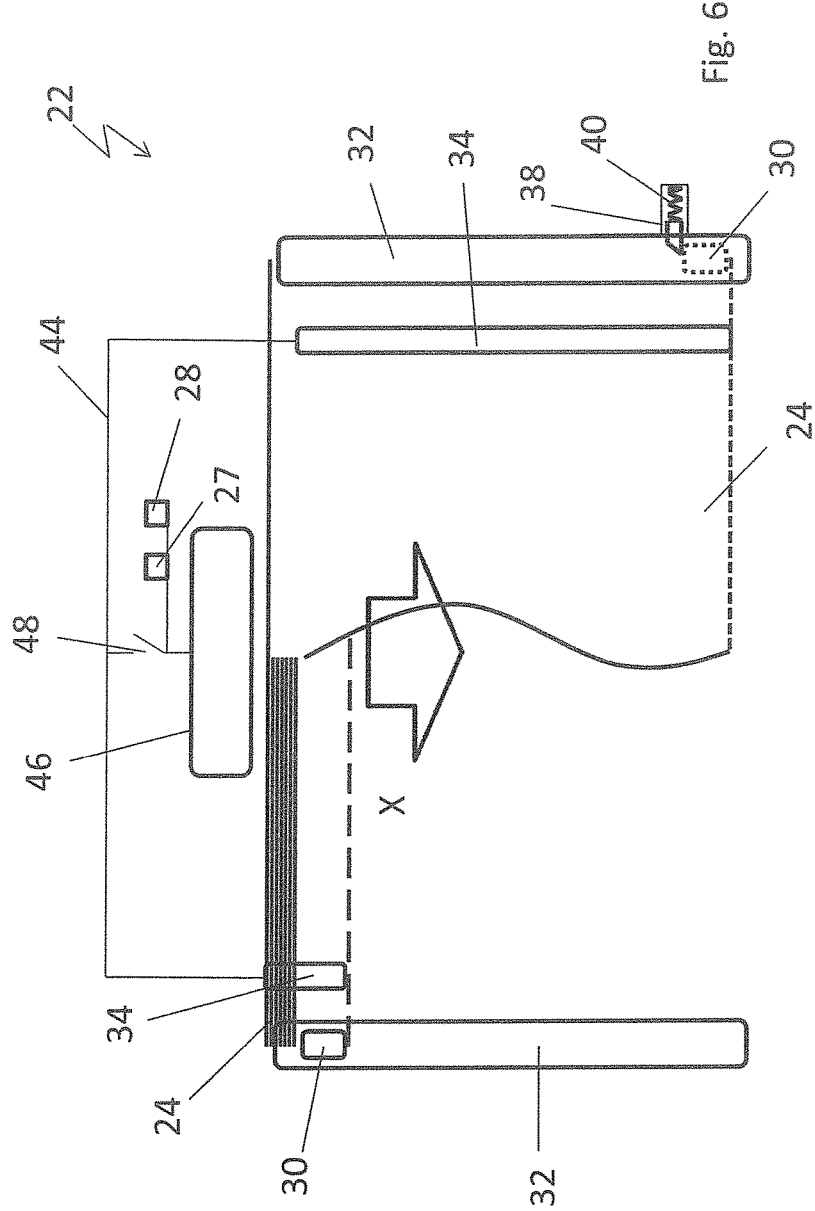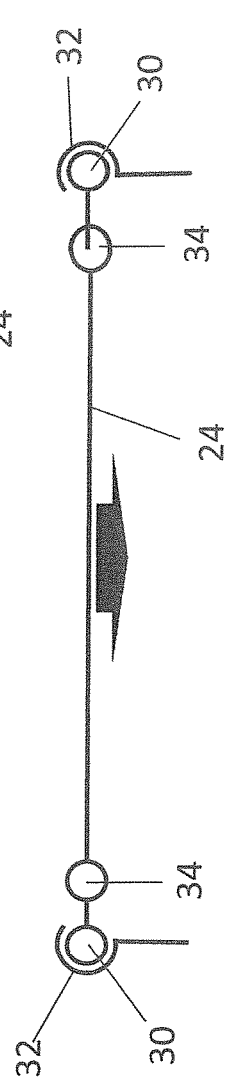

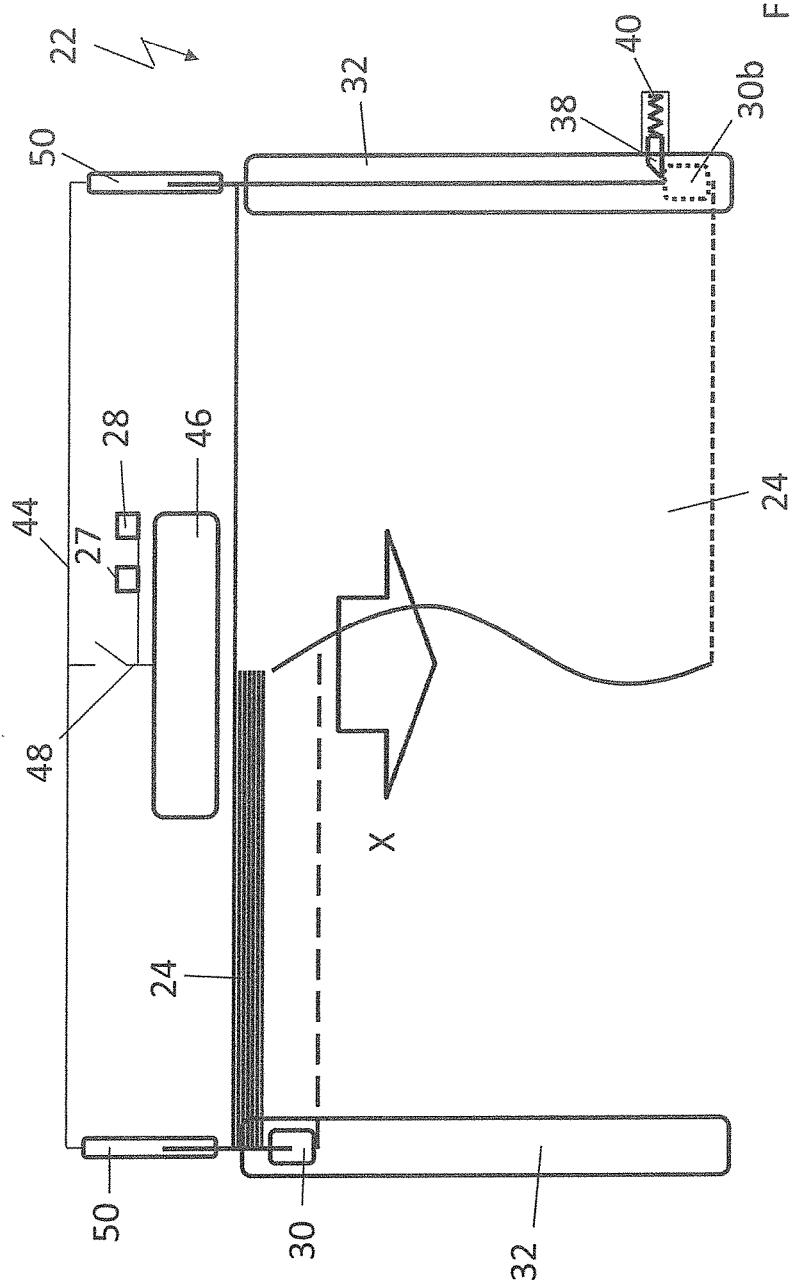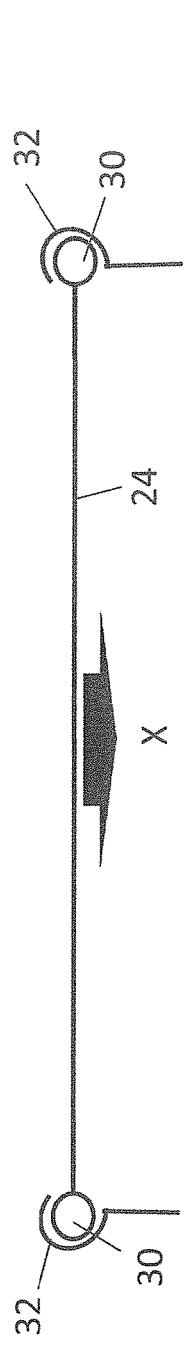

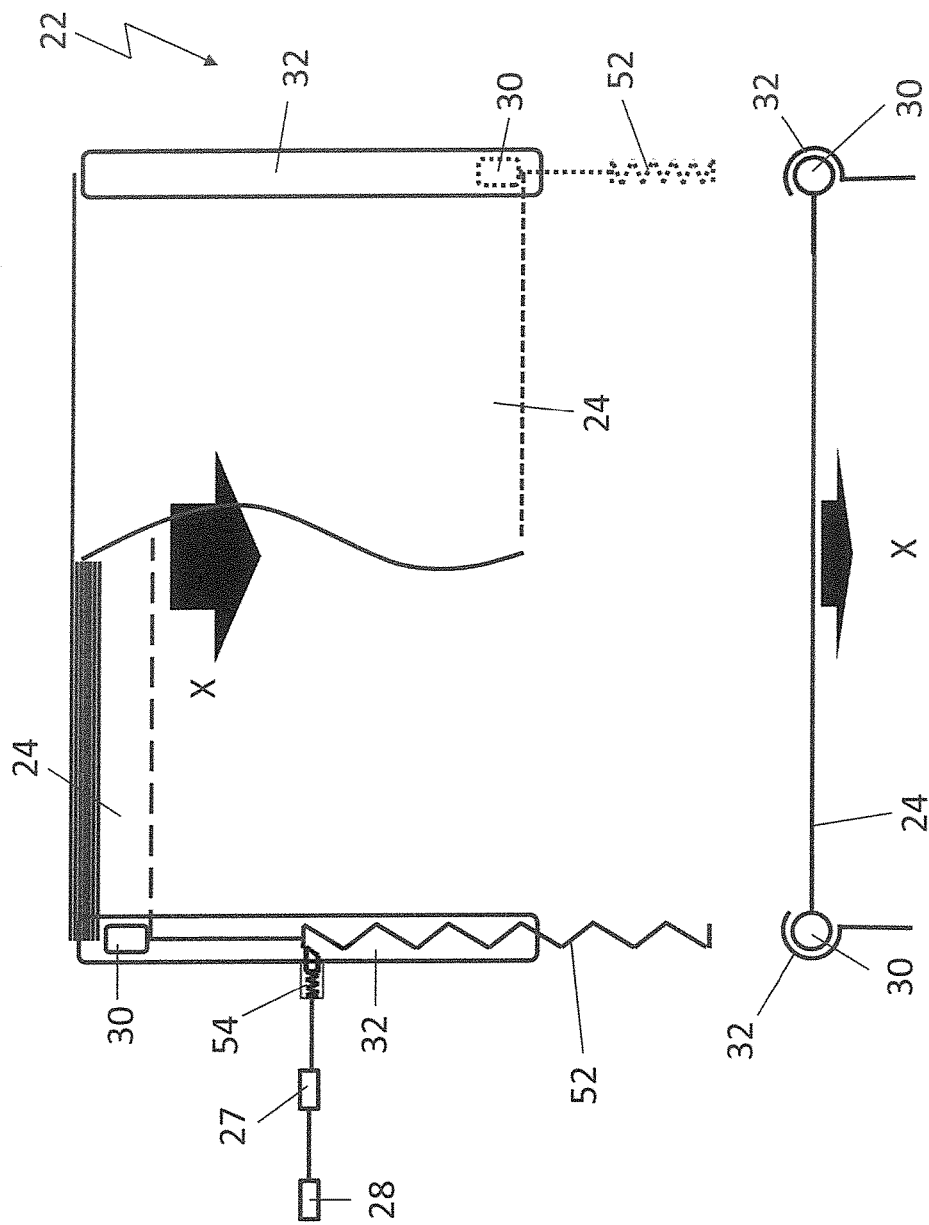

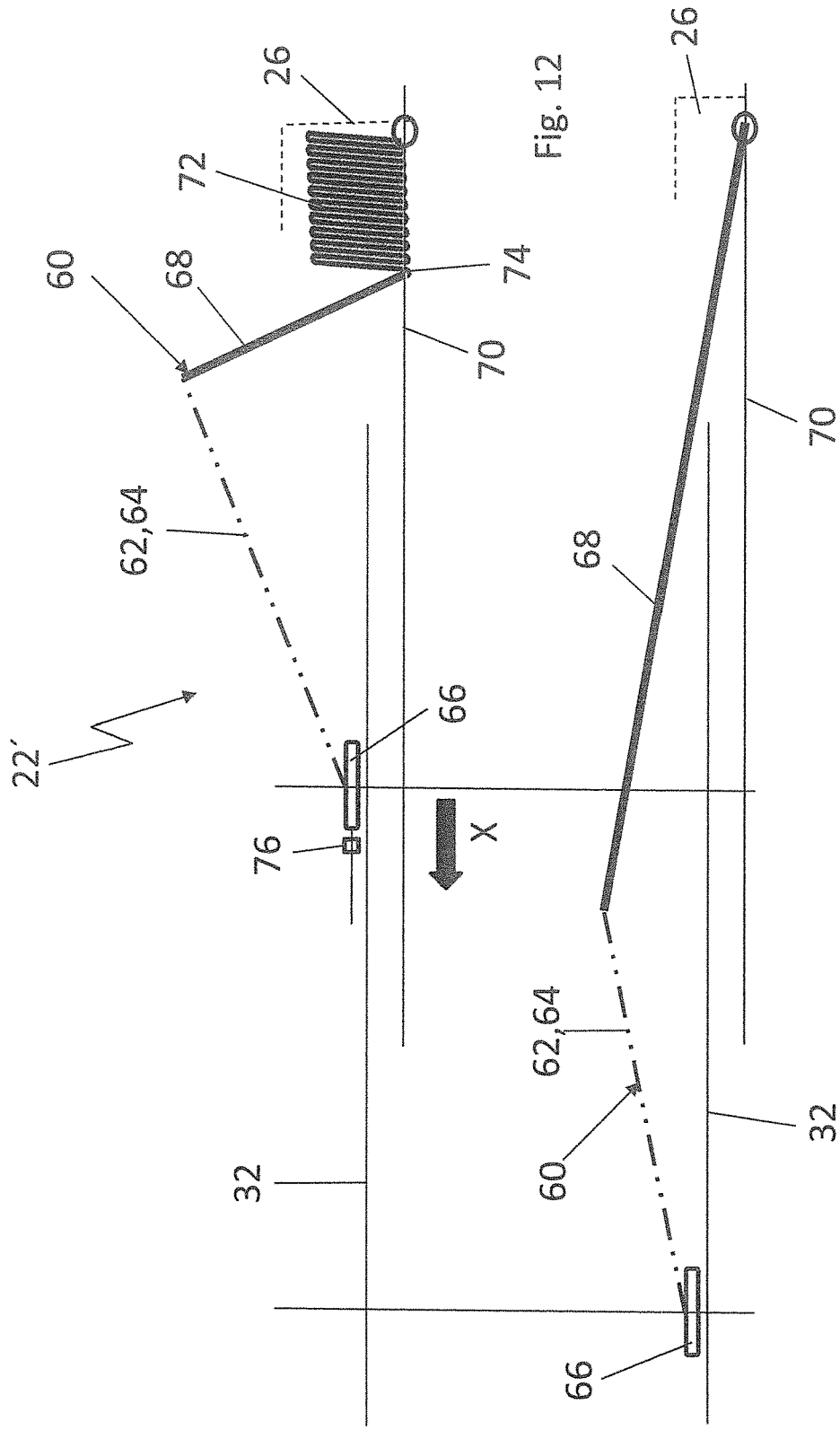

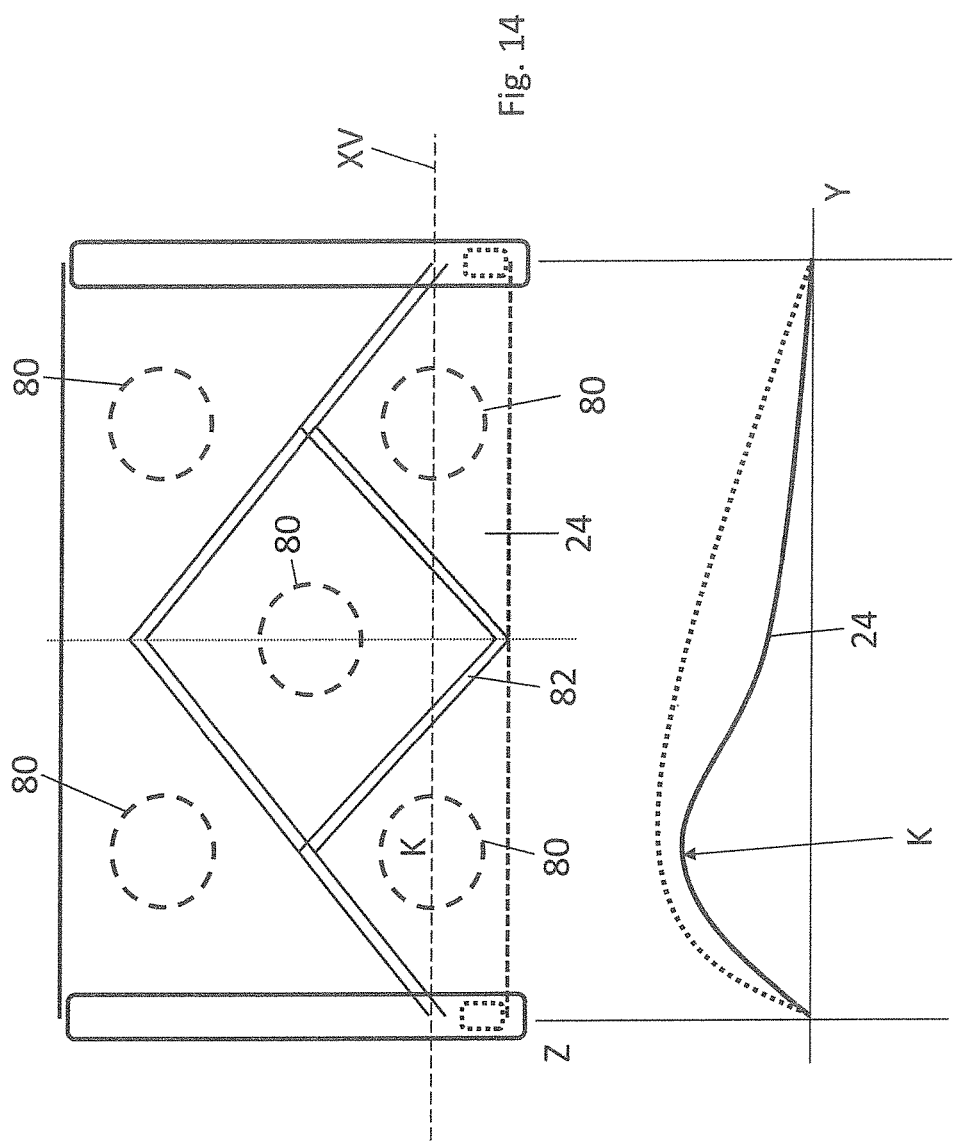

VEHICLE ROOF HAVING A ROOF OPENING

CROSS-REFERENCE TO RELATED APPLICATION

This application claims priority from German Application No. 10 2016 104 780.5, filed Mar. 15, 2016, which is hereby incorporated herein by reference in its entirety for all purposes.

FIELD

The invention relates to a vehicle roof having a roof opening.

BACKGROUND

Such vehicle roofs are known from practice and are generally part of a passenger car. The vehicle roof can be provided with a roof opening system, which comprises a displaceable panel element, by means of which the roof opening can be closed or at least partially released. The panel element can therefore be displaced between a closed position and a released position.

In particular when the panel element of the vehicle roof described above is in the released position, there is a risk of passengers being hurled out of the corresponding vehicle through the roof opening when being flipped over, i.e. when the vehicle is overturning, or of just a body part, such as an arm, protruding through the roof opening. This poses a significant risk of injury for the corresponding passengers.

The object of the invention is to create a vehicle roof of the type described above which allows the risk of injury to be decreased for passengers during an accident relative to conventional vehicle roofs having roof openings.

SUMMARY

The object is attained by the vehicle roof according to the invention having the features of claim 1.

Thus, the vehicle roof according to the invention comprises a roof opening, which can either be closed or at least partially released by means of a panel element or which can be tightly closed by means of a glass hardtop element or a plastic hardtop element. For reducing the risk of injury for passengers, the vehicle roof according to the invention is provided with an emergency retaining device, which is activated during the accident, in particular when the vehicle is overturning, and covers the roof opening by at least one fabric which can be folded or wound up. The fabric thus has a retaining function. It poses a protective element, which prevents the passengers from being hurled out of the vehicle or body parts from protruding out of the roof opening by actively closing the roof opening. Simultaneously, the retaining fabric, which can be a woven fabric, a net or even a foil, causes the interior of the corresponding vehicle to be separated from the vehicle surroundings as well as prevents objects, such as glass shards or similar, from entering the vehicle interior, said objects potentially posing a risk to the passengers. The fabric is wound up, in particular without using a winding shaft due to installation space restrictions, or folded in the storage position. The emergency retaining system can be integrated directly into a roof frame, in particular a sliding roof frame, including the required storage space.

Since the protective element is made of a fabric, which can be folded or wound up, the protective element has a certain elasticity, whereby it can function as an absorbing element by means of which peak loads can be reduced, which can occur upon impact of a passenger.

The driving device, which is connected to sensor technology capable of detecting an accident and perhaps already existent in the corresponding vehicle, drives the fabric, which can be folded and/or wound up, in such a manner that the fabric is brought from the storage position into the covering position sufficiently quickly, i.e. preferably within 100 milliseconds at most from detecting the accident, in particular within 25 milliseconds at most, said covering position presenting a safety layer and said fabric forming the protective element in said covering position.

Preferably, the emergency retaining device according to the invention maintains the covering position after being activated. The resulting protective effect therefore persists even if the corresponding accident is over. The emergency retaining device according to the invention therefore ensures a protective effect which is longer than the actual accident.

The fabric, which can be folded and/or wound up, is conveniently received by a storage space of the vehicle roof provided for this purpose when in the storage position. The storage space, as already mentioned above, is formed by a roof frame, for example, in particular a sliding roof frame.

In a preferred embodiment of the vehicle roof according to the invention, the driving device comprises at least one inflatable chamber, which displaces the fabric into the covering position during the accident. The inflatable chamber acts as a displacing element for the fabric, which can be folded and/or wound up. By inflating and thus enlarging the volume of the chamber, the chamber applies the required displacing torque to the fabric in order to displace the fabric from the storage position into the covering position. The chamber is the driving means for the fabric, the chamber being enlarged in volume essentially by the component acting in the pullout direction of the fabric.

In a particular embodiment of the vehicle roof according to the invention, the airbag-like inflatable chamber is incorporated into the fabric, said chamber extending parallel along a lateral edge of the fabric in its pullout direction in particular in the covering position and preferably a corresponding tube-like inflatable chamber being arranged on each of the two lateral edges of the fabric. The fabric itself does not form an airbag; only its drive is formed by at least one airbag-like chamber.

It is also possible for the chamber to act directly on a glider, which is connected to the fabric and initiates its displacing movement.

In a further embodiment of the vehicle roof according to the invention, the driving device comprises a gas pressure vessel, the fabric being displaced into the covering position upon release of the gas pressure vessel.

In the embodiment having the inflatable chamber, the gas pressure vessel can inflate the inflatable chamber in a split second via a corresponding valve after being released and thus displace the fabric from the storage position into the covering position.

Alternatively, it is possible, for the gas pressure cylinder to be connected to at least one pressure cylinder driving a glider, which is connected to the fabric and is guided in a guide track. By releasing the gas pressure vessel, the pressure cylinder is displaced in a pullout position, whereby the glider connected to the pressure cylinder pulls the fabric from the storage position into the covering position.

In a particularly fast acting embodiment of the vehicle roof according to the invention, the driving device comprises a reactive gas volume generator, upon whose activation the fabric is displaced into the covering position. A reactive gas volume generator is a pyrotechnical propellant, for example, which is known from conventional airbag systems and is ignited in the accident. After ignition, burn-off gases develop, which in particular can fill the inflatable chamber described above. When using sodium azide as a propellant, the burning rate is approximately 4,700 m/s, the temperature of the burn-off gas being between 400° C. and 500° C. and the expansion rate of the inflatable chamber being able to be several hundred kilometers per hour.

In an alternative embodiment of the vehicle roof according to the invention, the driving device comprises at least one mechanical spring, which is pre-tensioned in the storage position and is released when the vehicle is overturning, whereby the mechanical spring displaces the fabric into the covering position. The mechanical spring can be a tension spring, whose pretension is secured in particular by means of a retaining latch and which retracts when releasing the retaining latch. Alternatively, the mechanical spring can be a pre-tensioned pressure spring, which extends in axial direction upon release.

In order to provide the fabric of the emergency retaining device with a sufficient retaining force in the covering position, i.e. in the protective position, and in order to guide the displacing movement from the storage position into the covering position, at least one side of the fabric is guided in a guide track or rail, respectively, relative to the pullout direction of the fabric in a preferred embodiment of the vehicle roof according to the invention. The guide rail forms a lateral guide for the fabric and can also form a driving channel, in which the driving device for the fabric is arranged.

In order to retain the fabric in the covering position for a longer period of time and to thus give the emergency retaining device a protective function for a certain amount of time, a glider, to which the fabric is connected in the area of the guide track, can preferably be secured against being displaced in the direction of the storage position by means of an end position safeguard when in the covering position. The end position safeguard comprises, for example, a spring-loaded security bolt which acts in the same manner as a trap and has a slope or ramp for the glider so that the security bolt is pressed back despite the effect of the spring when the glider collides with the slope and snaps back into the securing position after moving over with the glider in order to retain the glider in the position allocated to the covering position.

In a specific embodiment of the vehicle roof according to the invention, the fabric is inhomogeneous across its entire surface and is provided with sections having different levels of elasticity. This can be realized by using darts or strips of fabric or by making the material thicker in some sections, however, in particular in collision areas against which a passenger's body parts could collide should be realized having little elasticity so that, as a result, the fabric is stretched as little as possible during impact.

The vehicle roof according to the invention can also be realized in such a manner that existing roof devices are used as an emergency retaining device, such as a wind deflector or a roof roller blind. Thus, the fabric is a component of a wind deflector of a roof opening system, for example, and is mounted to a pivotable wind deflector bracket at an edge extending in the transverse direction of the roof. In this case, the fabric of the emergency retaining device is formed in particular by the deflector or function element, respectively, realized as a net or woven material, said deflector or function element being folded when the wind deflector bracket is in the lowering position and is stretched in a released function position of the wind deflector bracket. In the vehicle roof according to the invention, the fabric or the net of the wind deflector net, respectively, is brought into the covering position by means of the driving device during an accident, the roof opening being covered at least partially in the covering position in order to protect passengers in the manner described above.

During standard operation of the vehicle, the available fabric of the wind deflector net only has measurements which correspond to the release angle of the wind deflector bracket and to its relative position with respect to an edge of the roof opening at the front of the vehicle. However, in order to be able to sufficiently stretch the fabric required for realizing the emergency retaining device over the roof opening, the fabric is preferably provided with a fabric supply, which takes up the storage position during standard operation of the vehicle and is secured in this position. The fabric supply is activated when the sensor detects an accident and the driving device is actuated for displacing the fabric into the covering position.

In order to secure the fabric supply during standard operation of the vehicle, at least one seam can be provided which has a defined tensile strength. The tensile strength is preferably chosen so that the force applied on the fabric by the driving device exceeds the tensile strength of the seam, whereby the seam is ripped in the accident and the fabric supply can be pulled over the roof opening from its folded or wound-up state.

In a specific embodiment of the vehicle roof according to the invention, in which the wind deflector is used as an emergency retaining device as intended by the invention, both sides of the wind deflector bracket are each mounted on a slider relative to a vertical longitudinal center plane of the roof, said slider being displaced toward the back of the vehicle by means of the driving device during the accident. The fabric supply is thus released and the fabric is brought into the covering position. The sliders are conveniently guided in guide tracks, which are formed at already existent guide tracks of the corresponding roof opening system.

In an alternative embodiment of the vehicle roof according to the invention, the wind deflector bracket is pivoted past its stop toward the back of the vehicle during an accident, said stop defining the regular acting position of the wind deflector bracket during standard operation of the vehicle. This means that the wind deflector bracket pulls the fabric supply out of its storage space by pivoting toward the back of the vehicle, whereby the covering position is then realized. Displaceable sliders would then not be necessarily required.

The vehicle roof according to the invention is preferably set up in such a manner that the fabric is arranged at an edge of the roof opening at the back of the vehicle when in the storage position and is pulled out towards the back of the vehicle during an accident. The fabric thus first covers the opening gap between the frontal edge of the roof opening and the displaceable panel element when being displaced into the covering position when the roof opening is open, dependently of the position of the panel element, meaning the critical area in the roof opening is covered first when activating the emergency retaining device. For this purpose, the fabric is preferably guided in lateral guide tracks.

It is also possible to pull a fabric, which is arranged at a front-side edge of the roof opening when in the storage position or at a front-side edge of a hardtop having glass or plastic elements, over the entire length of the roof toward the back of the vehicle during an accident and to thus bring it into the covering position.

Alternatively, the fabric can be arranged at a back-side edge of the roof opening when in the storage position, said fabric being pulled out toward the front of the vehicle during an accident.

It is also possible to arrange the fabric at the back-side edge of the vehicle roof when in the storage position so that, when activating the emergency retaining device, a hardtop section, which covers a back area of the vehicle passenger space and is realized by a hardtop element and fills a roof opening, as well as a roof opening opened toward the front side or rather a panel element sealing the roof opening are covered or spanned, respectively, when in the covering position.

In a special embodiment of the vehicle roof according to the invention, the fabric is preferably arranged in a panel frame at a front-side edge of the panel element when in the storage position, said fabric being pulled out toward the front side of the vehicle when the roof opening is opened during an accident. The driving device for the fabric is also conveniently arranged at the panel element. The fabric is also mounted to the panel element itself in order to be displaced from the back toward the front via the free cross section of the roof opening during an accident. In this case, catching devices are conveniently arranged at roof sections permanently mounted to the vehicle for the fabric, said catching devices keeping the fabric in place when in the covering position.

Moreover, a sensor can be provided in this embodiment, which detects the position of the panel element and allows activating the emergency retaining device only when the roof opening is released.

In a further alternative embodiment of the vehicle roof according to the invention, the fabric is arranged in particular in a guide track of the panel element at a lateral edge of the roof opening, said fabric being pulled out in the transverse direction of the roof during an accident. The driving device for the fabric is then also conveniently arranged at the guide track. In this case, the fabric is preferably made of two fabric cuts, which are each pulled inversely in the transverse direction of the vehicle starting at the two lateral edges of the roof opening in order to realize the covering position with short distances. The fabric cuts can overlap each other in the covering position or be adjacent to each other along their free edges. The fabric cuts are conveniently guided in corresponding guide tracks or rails, respectively, at the edges of the roof opening extending in the transverse direction of the vehicle, in particular at the front-side front edge of the roof opening, when pulling them into the covering position.

Further advantages and advantageous embodiments of the subject matter of the invention can be taken from the description, the drawing and the claims.

BRIEF DESCRIPTIONS OF THE DRAWINGS

Exemplary embodiments of a vehicle roof according to the invention are illustrated in a schematically simplified manner in the drawing and are further described in the following description. In the figures:

FIG. 1A shows an exemplary top view of a vehicle roof with an emergency retaining device in accordance with the disclosed embodiments;

FIG. 1B shows another exemplary top view of a vehicle roof with an emergency retaining device in accordance with the disclosed embodiments;

FIG. 1C shows another exemplary top view of a vehicle roof with an emergency retaining device in accordance with the disclosed embodiments;

FIG. 1D shows another exemplary top view of a vehicle roof with an emergency retaining device in accordance with the disclosed embodiments;

FIG. 1E shows another exemplary top view of a vehicle roof with an emergency retaining device in accordance with the disclosed embodiments;

FIG. 1F shows another exemplary top view of a vehicle roof with an emergency retaining device in accordance with the disclosed embodiments;

FIG. 1G shows another exemplary top view of a vehicle roof with an emergency retaining device in accordance with the disclosed embodiments;

FIG. 2 shows a side view of a folded fabric of an emergency retaining device in its storage position;

FIG. 3 shows a side view of a wound-up fabric of an emergency retaining device in its storage position;

FIG. 6 shows a top view of an alternative embodiment of an emergency retaining device when in its storage position and its covering position;

FIG. 7 shows a frontal view of the emergency retaining device according to FIG. 6;

FIG. 8 shows a top view of a further embodiment of an emergency retaining device when in its storage position and its covering position;

FIG. 9 shows a frontal view of the emergency retaining device according to FIG. 8;

FIG. 10 shows a top view of a further embodiment of an emergency retaining device when in its storage position and its covering position;

FIG. 11 shows a frontal view of the emergency retaining device according to FIG. 10;

FIG. 12 shows a schematic side view of a wind deflector of a vehicle roof according to the invention when in its storage position, said wind deflector serving as an emergency retaining device;

FIG. 13 shows the wind deflector used as an emergency retaining device according to FIG. 12 when in its covering position;

FIG. 14 shows a top view of a specific embodiment of a fabric of an emergency retaining device; and FIG. 15 shows a graph, which presents the deflection of the fabric according to FIG. 14 along a line XV in FIG. 14 when a head collides into the upward direction of the roof.

DETAILED DESCRIPTION

Figure 4:
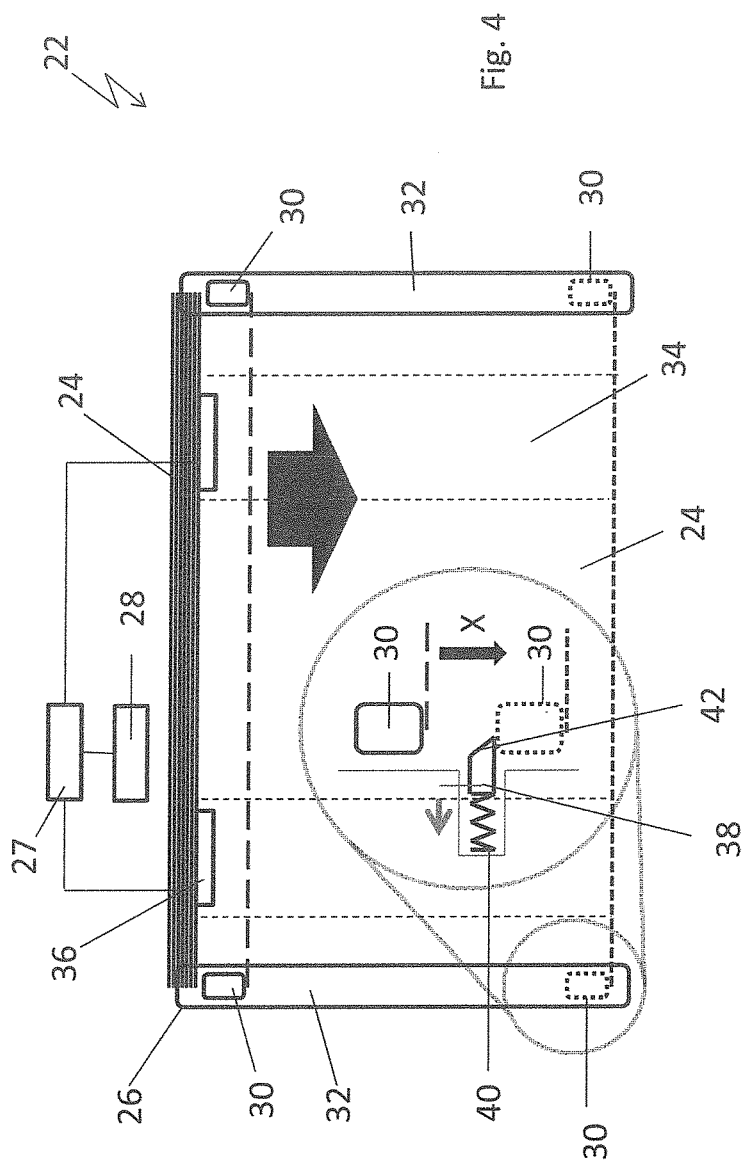
FIG. 4 shows a schematic top view of an emergency retaining device of a vehicle roof according to the invention when in its storage position and its covering position.

In each of the FIGS. 1a to 1g, a top view of a vehicle roof 10 is illustrated, which is a component of a passenger car realized as a sedan and comprises a back-side hardtop section 12 made of a glass element, said hardtop section 12 being limited by a back-side windshield apron 14 in the back and by a roof opening 16 in the front, which are arranged above front seats, not further displayed, of the corresponding vehicle. The roof opening 16 can be optionally closed or at least partially opened by means of a panel element 18. At the front or rather at the front side, the roof opening 16 is limited by a frontal windshield apron 20, which is an upper frame section of a windshield wiper frame extending in the transverse direction of the vehicle. The panel element 18 is a component of a roof opening system and realized as a glass panel, which can be displaced over the back-side hardtop section 12 in the manner of a spoiler for releasing the roof opening 16.

The vehicle roofs 10 illustrated in FIGS. 1*a* to 1*g* are each provided with an emergency retaining device 22, which is deactivated during standard operation of the vehicle and can be brought into a covering position during an accident, in particular when the vehicle is overturning, at least said roof opening 16 being at least partially covered in the covering position so that passengers cannot be hurled out of the vehicle and no alien objects can enter the vehicle interior, which could injure the passengers, in particular when the roof opening 16 is open. The emergency retaining devices 22 illustrated in FIGS. 1*a* to 1*g* each comprise a fabric 24, which can be folded or wound up and is in a storage position of the vehicle during standard operation of the vehicle, as shown in FIGS. 1*a* to 1*g*, and is received in the storage space 26 when gathered, folded or wound up.

In the embodiment shown in FIG. 1*a*, the storage space 26 is arranged along a frontal or rather front-side edge of the roof opening 18 in the area of the frontal windshield apron 20. The storage space 26 can be formed by a sliding roof frame. For displacing the fabric 24 into its covering position, it is pulled out toward the back of the vehicle all the way toward the back of the vehicle or rather back-side edge of the roof opening 16, as shown by an arrow X.

In the embodiment shown in FIG. 1*b*, the fabric 24 is also arranged at a frontal or rather front-side edge of the roof opening 16 in a corresponding storage space 26 when in its storage position, which can be integrated into a sliding roof frame. For activating or displacing, respectively, the fabric 24 into the covering position, it is pulled out all the way to the back or rather back-side edge of the vehicle roof, i.e. toward the back-side windshield apron 14, as shown by the arrow X, whereby the roof opening 16 as well as the hardtop section 12 are spanned or covered, respectively.

In the embodiment shown in FIG. 1*c*, the fabric 24 is arranged in a storage space 26 when in its storage position, said storage space 26 extending at the back-side edge of the roof opening 16 in the transverse direction of the vehicle. For activating the emergency retaining device 22, the fabric 24 is pulled out toward the front of the vehicle all the way to the frontal windshield apron 20 according to the arrow X in order to cover the roof opening 16.

In the embodiment shown in FIG. 1*d*, the emergency retaining device 22 or rather its fabric 24 is arranged at the back-side edge of the vehicle roof 10 when in the storage position, more specifically in a storage space 26, which extends along the back windshield apron 14 in the transverse direction of the vehicle. For pulling the fabric 24 out into the covering position, it is pulled out all the way to the frontal windshield apron 20 according to the arrow X so that the back-side hardtop section 12 as well as the roof opening 16 are covered by the fabric 24.

In the embodiment shown in FIG. 1*e*, the fabric 24 of the emergency retaining device 22 is received by a storage space 26 when in its storage position, said storage space 26 being arranged at a frontal edge of the panel element 18. During an accident or when the vehicle is overturning, the fabric 24 is pulled out from the frontal edge of the panel element 18 all the way to the frontal windshield apron 20 according to the arrow X, should the panel element 18 be in an opening position, so that the fabric 24 is in a covering position regarding the roof opening 16.

In the embodiment according to FIG. 1*f*, the emergency retaining device 22 comprises a fabric made of two fabric cuts 24A and 24B, which are each rectangular in form and are each arranged in a corresponding storage space 26A or 26B, respectively, at a lateral edge of the roof opening 16 relative to a vertical longitudinal center plane of the roof when gathered, folded or wound-up, i.e. when in their storage position. During an accident or when the vehicle is overturning, the fabric cuts 24A and 24B are pulled out toward the vertical longitudinal center plane of the roof according to the arrows X in order to cover the roof opening 16.

In the embodiment according to FIG. 1*g*, the emergency retaining device 22 also comprises a fabric made of two fabric cuts 24A and 24B which are essentially triangular and are each arranged in a corresponding storage space 26A or 26B, respectively, at a lateral edge of the roof opening 16. During an accident or when the vehicle is overturning, the emergency retaining device 22 is activated in such a manner that the fabric cuts 24A and 24B are pulled out inversely over the roof opening 16 according to the arrows X. In the covering position shown in FIG. 1 by a dashed line, the fabric cuts 24A and 24B have a front-side triangular covering area having a high retaining force.

As can be seen in FIG. 2, the fabric 24 of the emergency retaining device 22 shown in FIGS. 1*a* to 1*g* can each be received by the storage space 26 in a folded or gathered state, respectively. In the area of the frontal edge, the fabric 24 can be provided with a glider 30 at each lateral side, said glider 30 being guided along or in a guide track 32, which extends along the corresponding edge of the roof opening 16 and which can be a component of a guide track of a roof opening system to which a panel element 16 is allocated.

As shown in FIG. 3, the fabric 24 can alternatively be received by the storage space 26 in a wound-up state in the manner of a roller blind when in the storage position. When displacing the fabric 24 from the storage position into the covering position, the fabric 24 is unwound in the manner of a roller blind in order to cover the roof opening 16.

The emergency retaining devices 22 shown in FIGS. 1*a* to 1*g*, which can each cover a roof opening during an accident, each comprise a driving device, which is provided with a triggering device 27, which works dependently of the signal from a sensor 28, which detects the accident. In order to displace the fabric 28 into the covering position, the gliders 30 are displaced or closed in the pullout direction of the fabric 24 by means of the driving device. The driving device can be realized in different manners, said driving device activating a sudden displacement of the fabric 24 or the fabric cuts 24A and 24B, respectively, from the storage position into the covering position within 100 ms at most. Suitable driving devices are shown as examples in FIGS. 4 to 11.

Figure 5:
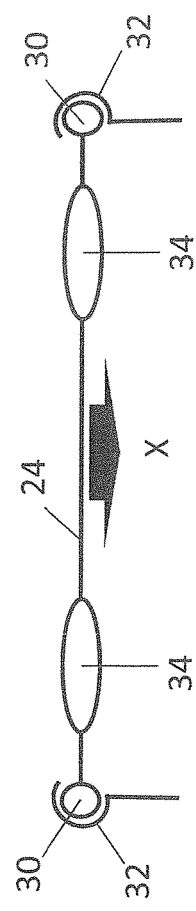
FIG. 5 shows a frontal view of the emergency retaining device according to FIG. 4.

In FIGS. 4 and 5, an emergency retaining device 22 is shown, which can be used in particular within the scope of the FIGS. 1*a* to 1*d* for covering a roof opening or rather a hardtop element, which closes a roof opening. This emergency retaining device 22 comprises a fabric 24, which is arranged in a storage space of the roof at an edge of the roof section when in a folded state. The fabric 24, which can be made of a net, can be provided with a glider 30 at each of the lateral edges of the fabric 24 in the area of the front-side frontal edge, said glider 30 being guided in a guide track 32. For driving the fabric 24, two inflatable chambers 34 are incorporated into the net-like fabric 24, for example, said inflatable chambers 34 extending parallel to the guide tracks 32 in the longitudinal direction of the roof when in the covering position, shown by dashed lines in FIG. 4. A pyrotechnical propellant 36 is arranged in each of the inflatable chambers 34, said pyrotechnical propellant 36 being able to be ignited by a corresponding control signal of a triggering device 27 as well as inflating the inflatable chambers 34 via the resulting burn-off gases and thus bringing the fabric 24 into its pullout or covering position, respectively. The gliders 30 each move over a security bolt 38 at the end of the travel distance of the gliders 30, the respective security bolt 38 being mounted at a spring 40 and being provided with an ascension slope 42 for the corresponding glider 30. After moving over the security bolts 38, the gliders 30 jump back into their starting position due to the action of the spring 40 and thus secure the fabric 24 in its covering position.

An alternative embodiment of an emergency retaining device 22 is shown in FIGS. 6 and 7, a storage position being shown in the left partial area in FIG. 6 and a covering position being shown for a fabric 24 in the right partial area, said fabric 24 forming the protective element of the emergency retaining device. This embodiment corresponds mostly to the embodiment shown in FIGS. 4 and 5 but differs from it in that it comprises inflatable chambers 34, which are sewn into a net-like fabric 24 and are connected to a gas pressure vessel 46 via pipes 44. A valve 48 is arranged in the pipes 44 between the gas pressure vessel 46 and the inflatable chambers 34, said valve 48 being connected to a triggering device 27 via a control line, said triggering device 27 in turn being connected to the sensor 28 for detecting the accident. During the accident, the triggering device 27 gives the valve 48 a control signal so that the valve 48 is closed and the inflatable chambers 34 are immediately filled with gas which is provided in the gas pressure vessel 46 via overpressure. In this manner, the fabric 24 is pulled out of its storage position into the covering position. As in the embodiment of FIGS. 4 and 5, the gliders 30, which are connected to the fabric 24 and are guided in guide tracks 32, each move over a security bolt 38 at the end of their travel distance, said security bolts 32 also snapping back into their starting position after being moved over and holding the corresponding glider 30 in the position allocated to the covering position.

A further embodiment of an emergency retaining device 22 is shown in FIGS. 8 and 9, mostly corresponding to the emergency retaining device 22 shown in FIGS. 6 and 7, though differing in that it does not comprise inflatable chambers, which are incorporated into the fabric 24 for covering the roof opening. In fact, the emergency retaining device 22 shown in FIGS. 8 and 9 comprise two gas pressure cylinders 50, which are connected to the gas pressure vessel 46 via pipes 44. A valve 48 is arranged in the pipes 44, said valve 48 being connected to a triggering device 27 via a control line, said triggering device 27 in turn being connected to a sensor 28 of the vehicle, which detects an accident or when the vehicle is overturning.

The gas pressure cylinders 50 are each connected to a glider 30, which is mounted to the fabric 24 according to the gliders of the embodiment shown in FIGS. 6 and 7 and is guided in a guide track 32.

During an accident, the triggering device 27 switches the valve 48 into a closing position, whereby the gas pressure cylinders 50 suddenly displace the gliders 30 into the guide tracks 32 via the gas pressure in the gas pressure vessel 40 and the fabric 24 is brought into the covering position (right partial area in FIG. 8) from the storage position (left partial area in FIG. 8). The gliders 30, in turn, are each secured in the covering position via a spring-loaded security bolt 38, which is realized according to the embodiment described above.

In the embodiment according to the FIGS. 10 and 11, the emergency retaining device 22, which mostly corresponds to the emergency retaining devices described above, comprises mechanical springs 52, each acting as tension springs, as a driving device for gliders 30, which are mounted to the frontal edge of a fabric 24 and are displaceably guided in guide tracks 32, said springs 52 each being pre-tensioned in the storage position (left partial area in FIG. 10) of the fabric 24. The pre-tensioned position of each spring 52 is secured by a security bolt 54, which can be pulled into a released position, in which the corresponding tension spring 52 retracts and displaces the corresponding glider 30 in the guide track 32, by means of a triggering device 27, which is connected to a sensor 28 for detecting an accident. In doing so, the fabric 24 can be brought into the covering position from the storage position, the roof opening being at least partially covered by the fabric 24 and the passengers being protected when in the covering position (right partial area in FIG. 10).

In FIGS. 12 and 13, an embodiment of an emergency retaining device 22' is shown, which is incorporated into a wind deflector 60, which is realized as a wind deflector net and is arranged at the frontal edge of a roof opening. The wind deflector 60 comprises a pivoting bracket 62, which comprises a displacing arm 64 on each of its two sides relative to a vertical longitudinal center plane of the roof, said displacing arm 64 being pivotably mounted to a corresponding slider 66. As usual with wind deflector nets, which are allocated to a roof opening system, a fabric 68 serving as a deflecting element or a function element, respectively, is mounted to the pivoting bracket 62, said fabric 68 being made of a net and being spanned between the tilted pivoting bracket 62 and a basis 70 mounted permanently to the vehicle when in the acting position shown in FIG. 12. The wind deflector 60 takes up its acting position when a panel element of the roof opening system is displaced toward the back of the vehicle for releasing the roof opening.

The fabric 68 is provided with a fabric supply 72, which is received in a storage space 26 of the corresponding vehicle roof, in particular a sliding roof frame, in the manner shown in FIG. 12 during standard operation of the corresponding vehicle. The fabric supply 72 is secured by a seam 74, by means of which the fabric 68 is sewn to the basis 70 mounted permanently to the vehicle and which has a defined tensile strength. The position of the seam 74 at the fabric 68 defines the spanning height of the fabric 68 on the one hand and the length of the fabric of the fabric supply 72 on the other hand.

The sliders 66, to which the pivoting arms 64 of the pivoting bracket 62 are mounted, can each be displaced in guide tracks 32 from lateral guide tracks of the roof opening system. For this purpose, the sliders 66 are each provided with a driving device, which consists of a tension spring or an inflatable chamber and becomes active upon detecting an accident or when the corresponding vehicle is overturning. The seam 74 is ripped open via the translatory displacement of the sliders 66 by means of the driving device toward the back-side of the vehicle according to the arrow X so that the fabric supply 72 is pulled out of the storage space 26 via the displacement of the pivoting bracket 62 toward the back-side of the vehicle and brought into the covering position over the corresponding roof opening.

The sliders 66 can be secured in their corresponding position shown in FIG. 12 via retaining latchs 76 during standard operation of the corresponding vehicle. By pulling the retaining latchs 76 back, the driving device can act on the sliders 66 and suddenly pull the sliders 66 toward the back of the vehicle into the position shown in FIG. 13.

In FIG. 14, a fabric 24 of an emergency retaining device 22 of the manner described above is shown. The fabric 24 is provided with darts 80 and strips of fabric 82 across its surface, said darts 80 and strips of fabric 82 defining different levels of elasticity. As can be seen by the solid line in FIG. 15, lesser deflections, for example when a head collides into a front left area K, which is limited by a strip of fabric 80 and to which an arrow K is allocated in FIG. 15, are yielded in the upward direction Z of the vehicle due to the zones having different levels of elasticity with respect to a fabric having no darts (dashed line A) across the width of the fabric in the transverse direction of the vehicle, meaning in direction Y.

The invention claimed is:

1. A vehicle roof, comprising
a roof opening, which is closable or at least partially released by a panel element or which is closed by a glass hardtop element or a plastic hardtop element,
as well as an emergency retaining device, which is deactivated during standard operation of the corresponding vehicle and which at least partially covers the roof opening during an accident, in particular when the vehicle is overturning, and which comprises at least one fabric, which is able to be folded or wound up,
said fabric taking up a folded and/or wound-up storage position during standard operation of the vehicle and being pulled out by a driving device during the accident and being brought into a covering position so that the roof opening is at least partially covered by the fabric, said driving device working dependently of a signal from a sensor which detects the accident; and
wherein the driving device comprises a gas pressure vessel, said fabric being displaced into the covering position upon release of the gas pressure vessel.

2. The vehicle roof according to claim 1, wherein the driving device comprises at least one inflatable chamber, said inflatable chamber displacing the fabric into the covering position when the vehicle is overturning.

3. The vehicle roof according to claim 2, wherein the inflatable chamber is incorporated into the fabric and extends parallel to a lateral edge of the fabric in its pullout direction when in the covering position.

4. The vehicle roof according to claim 1, wherein the gas pressure vessel is connected to at least one pressure cylinder, which drives a glider connected to the fabric and guided in a guide track.

5. The vehicle roof according to claim 1, wherein the driving device comprises a reactive gas volume generator, said fabric being displaced into the covering position upon activation of the gas volume generator.

6. The vehicle roof according to claim 1, wherein at least one side of the fabric is guided in a guide track relative to its pullout direction.

7. The vehicle roof according to claim 6, wherein the fabric is connected to a glider in the area of the guide track, said glider being secured against being displaced toward the storage position, when in the covering position by an end position safeguard.

8. The vehicle roof according to claim 7, wherein the end position safeguard comprises a spring-loaded security bolt.

9. The vehicle roof according to claim 1, wherein the fabric is inhomogeneous across its surface and comprises sections having different levels of elasticity.

10. The vehicle roof according to claim 1, wherein the fabric is arranged at a back-side edge of the roof opening when in the storage position and is pulled out toward the front of the vehicle during an accident.

11. The vehicle roof according to claim 1, wherein the fabric is arranged at a front-side edge of the panel element when in the storage position and is pulled out, when the roof opening is released, toward the front of the vehicle during an accident.

12. A vehicle roof, comprising
a roof opening, which is closable or at least partially released by a panel element or which is closed by a glass hardtop element or a plastic hardtop element,
as well as an emergency retaining device, which is deactivated during standard operation of the corresponding vehicle and which at least partially covers the roof opening during an accident, in particular when the vehicle is overturning, and which comprises at least one fabric, which is able to be folded or wound up,
said fabric taking up a folded and/or wound-up storage position during standard operation of the vehicle and being pulled out by a driving device during the accident and being brought into a covering position so that the roof opening is at least partially covered by the fabric, said driving device working dependently of a signal from a sensor which detects the accident, and
wherein the driving device comprises at least one mechanical spring, which is pre-tensioned in the storage position and released when the vehicle is overturning so that the mechanical spring displaces the fabric into the covering position.

13. The vehicle roof according to claim 12, wherein the mechanical spring is a tension spring, whose pre-tension position is secured by a retaining latch.

14. A vehicle roof, comprising
a roof opening, which is closable or at least partially released by a panel element or which is closed by a glass hardtop element or a plastic hardtop element,
as well as an emergency retaining device, which is deactivated during standard operation of the corresponding vehicle and which at least partially covers the roof opening during an accident, in particular when the vehicle is overturning, and which comprises at least one fabric, which is able to be folded or wound up,
said fabric taking up a folded and/or wound-up storage position during standard operation of the vehicle and being pulled out by a driving device during the accident and being brought into a covering position so that the roof opening is at least partially covered by the fabric, said driving device working dependently of a signal from a sensor which detects the accident,
wherein the fabric is part of a wind deflector of a roof opening system and is mounted to a pivotable wind deflector bracket with an edge extending in the transverse direction of the roof.

15. The vehicle roof according to claim 14, wherein the fabric is provided with a fabric supply, which takes up the storage position during standard operation of the vehicle and is secured in this position.

16. The vehicle roof according to claim 15, wherein the fabric supply is secured by at least one seam, which has a defined tensile strength.

17. The vehicle roof according to claim 15, wherein both sides of the wind deflector bracket are each mounted at a slider relative to a vertical longitudinal center plane of the roof, said glider being displaced toward the back of the vehicle by the driving device during the accident so that the fabric supply is released and the fabric is brought into the covering position.

18. A vehicle roof, comprising
a roof opening, which is closable or at least partially released by a panel element or which is closed by a glass hardtop element or a plastic hardtop element,
as well as an emergency retaining device, which is deactivated during standard operation of the corresponding vehicle and which at least partially covers the roof opening during an accident, in particular when the vehicle is overturning, and which comprises at least one fabric, which is able to be folded or wound up,
said fabric taking up a folded and/or wound-up storage position during standard operation of the vehicle and being pulled out by a driving device during the accident and being brought into a covering position so that the roof opening is at least partially covered by the fabric, said driving device working dependently of a signal from a sensor which detects the accident,
wherein the fabric is arranged at the front-side edge of the roof opening when in the storage position and is pulled out toward the back of the vehicle during an accident.

19. A vehicle roof, comprising
a roof opening, which is closable or at least partially released by a panel element or which is closed by a glass hardtop element or a plastic hardtop element,
as well as an emergency retaining device, which is deactivated during standard operation of the corresponding vehicle and which at least partially covers the roof opening during an accident, in particular when the vehicle is overturning, and which comprises at least one fabric, which is able to be folded or wound up,
said fabric taking up a folded and/or wound-up storage position during standard operation of the vehicle and being pulled out by a driving device during the accident and being brought into a covering position so that the roof opening is at least partially covered by the fabric, said driving device working dependently of a signal from a sensor which detects the accident,
wherein the fabric is arranged at a lateral edge of the roof opening when in the storage position and is pulled out in the transverse direction of the roof during an accident.

* * * * *